(12) United States Patent
Fujiwara et al.

(10) Patent No.: US 6,703,432 B1
(45) Date of Patent: Mar. 9, 2004

(54) MOISTURE ADSORBING AND DESORBING MATERIAL

(75) Inventors: Kunio Fujiwara, Kanagawa (JP); Kazuyoshi Takeda, Kanagawa (JP); Hiroshi Yokota, Kanagawa (JP); Hidenobu Arimitsu, Kanagawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 10/110,736

(22) PCT Filed: Oct. 18, 2000

(86) PCT No.: PCT/JP00/07205

§ 371 (c)(1),
(2), (4) Date: Aug. 7, 2002

(87) PCT Pub. No.: WO01/28663

PCT Pub. Date: Apr. 26, 2001

(30) Foreign Application Priority Data

Oct. 19, 1999 (JP) ............................................. 11/296460

(51) Int. Cl.⁷ ............................ C08F 36/00; C08F 8/32; C08F 8/36; C08F 8/40; C08F 8/44
(52) U.S. Cl. ....................... 521/149; 521/150; 525/301; 525/296; 525/327.4; 525/327.5; 525/329.4; 525/329.9; 525/330.4
(58) Field of Search ................................. 521/149, 150; 525/301, 330.4, 327.5, 327.4, 329.9, 329.4, 296, 85, 192, 194; 526/325; 522/123, 144

(56) References Cited

U.S. PATENT DOCUMENTS

| | | | |
|---|---|---|---|
| 4,036,588 A | * | 7/1977 | Williams et al. |
| 4,340,057 A | * | 7/1982 | Bloch et al. |
| 5,274,028 A |   | 12/1993 | Bertrand et al. |
| 6,020,278 A | * | 2/2000 | Gatenholm |
| 6,143,390 A |   | 11/2000 | Takamiya et al. |

FOREIGN PATENT DOCUMENTS

| | | |
|---|---|---|
| EP | 0 596 441 | 5/1994 |
| EP | 0 822 004 | 2/1998 |
| JP | 07-204451 | 8/1995 |
| JP | 9-024235 | 1/1997 |
| JP | 09-103635 | 4/1997 |
| JP | 10-043540 | 2/1998 |
| JP | 11-116958 | 4/1999 |
| WO | 97 22744 | 6/1997 |

OTHER PUBLICATIONS

Patent Abstracts of Japan, vol. 1995, No. 7, Aug. 31, 1995 & JP 07 090774 A (Unitika Ltd.), Apr. 4, 1995.
Patent Abstract of Japan, vol. 013, No. 020, Jan. 18, 1989 & JP 63 231125 A (Toray Ind. Inc.), Sep. 27, 1988.
A.W. Czanderna et al., "Polymers As Advanced Materials For Desiccant Applications 2. Alkali Salts of Polystyrene Sulfonic Acid", ASHRAE Transactions, 97 (2), pp. 615–623, 1991.

* cited by examiner

*Primary Examiner*—James J. Seidleck
*Assistant Examiner*—Olga Asinovsky
(74) *Attorney, Agent, or Firm*—Wenderoth, Lind & Ponack, L.L.P.

(57) ABSTRACT

An object of the present invention is to provide a water adsorbing/desorbing organic polymer material having excellent water adsorbing/desorbing performance and which is inexpensive and readily disposable by incineration or the like. In order to attain this object, water adsorbing/desorbing organic polymer materials of the present invention are characterized by having a polymer side chain containing a hydrophilic group on the backbone of an organic polymer base.

5 Claims, No Drawings

MOISTURE ADSORBING AND DESORBING MATERIAL

FIELD OF THE INVENTION

The present invention relates to materials adsorbing/desorbing water in gases. Particularly, the present invention relates to desiccants used for controlling the humidity in air-conditioners.

PRIOR ART

Desiccant air-conditioners incorporating an equipment capable of continuously adsorbing/desorbing water with a desiccant have been commercialized.

Performance of such desiccant air-conditioners greatly depends on the performance of the desiccant used therein. Conventional desiccants for this purpose were inorganic desiccants such as silica gel and zeolite. Such desiccants are used to adsorb water at room temperature, and after they are used for a period, they should desorb water by passing high temperature air therethrough to regenerate adsorption performance. The above inorganic materials could attain a reasonable performance in a wide temperature range from 20° C. for water adsorption to 100° C. for water desorption because they are heat-resistant enough to endure air flow at a high temperature of 100° C. or more fed to desiccants.

However, further improvement in performance of desiccants is required from the social background of resource saving, energy saving and global environmental protection. Namely, there is an urgent need for measures against the heating temperature of the regenerating air, the heat capacity of desiccants, formability, selection of readily disposable materials, etc.

As one of measures, the use of organic polymer materials having a water adsorbing/desorbing function has been proposed and suggested to be capable of lowering the heating temperature of the regenerating air. Representative examples of such organic polymer materials having a water adsorbing/desorbing function are ion exchange resins.

Water adsorbing/desorbing performance of organic polymer materials greatly depends on the nature of the functional group (hydrophilic group) and the polymer structure. Hydrophilic groups can adsorb water by coordinating water around them, but sufficient water adsorbing/desorbing performance cannot be expected unless organic polymers have a polymer structure in which water molecules can readily diffuse around hydrophilic groups.

In all desiccants comprising organic polymer materials so far proposed including ion exchange resins, the polymer chain has a crosslinked structure, which blocks diffusion of water molecules so that these desiccants could not attain sufficient water adsorbing/desorbing performance though they have a hydrophilic group, whereby they had to be charged in considerable amounts in desiccant air-conditioners or involved high costs.

DISCLOSURE OF THE INVENTION

The present invention solves the problems of desiccants comprising conventional organic polymer materials as described above and provides a water adsorbing/desorbing organic polymer material having excellent water adsorbing/desorbing performance.

The present invention relates to a water adsorbing/desorbing material characterized by having a polymer side chain containing a hydrophilic group on the backbone of an organic polymer base.

Generally, water adsorbing/desorbing materials comprising an organic polymer contain a hydrophilic group on their polymer backbones to confer a water adsorbing/desorbing function and the polymer backbones are crosslinked to each other to compensate for deterioration of physical strength due to introduction of this hydrophilic group. Typical examples thereof are ion exchange resins, in which an ion exchange group such as a sulfone or quaternary ammonium group has been generally introduced into the backbone of a polystyrene obtained by polymerizing a styrene monomer. However, these ion exchange groups become bulky by coordinating several water molecules around them once they adsorb water, so that the resins are insufficient in physical strength and dissolve even in water. In order to solve this problem with ion exchange resins, polystyrene backbones are crosslinked to each other with a crosslinker such as divinylbenzene. This enhances physical strength of the resins, which no more dissolve in water at the expense of lowered absorption/desorption functions such as absorption speed or diffusion speed due to the formation of a crosslinked structure.

According to the present invention, it was found that excellent water adsorbing/desorbing performance can be conferred on an organic polymer base while keeping physical strength of the polymer backbone by introducing a side chain in the form of a polymer chain containing a hydrophilic group onto the polymer backbone of the base. Water adsorbing/desorbing materials of the present invention can considerably keep adsorption/desorption speed and diffusion speed because their polymer backbones have no more crosslinked structure. In water adsorbing/desorbing materials of the present invention, their polymer backbones have the role of keeping physical strength or shape.

THE MOST PREFERRED EMBODIMENTS OF THE INVENTION

In water adsorbing/desorbing organic polymer materials of the present invention, suitable means for introducing a side chain in the form of a polymer chain containing a hydrophilic group onto the polymer backbone include graft polymerization. Especially, radiation-induced graft polymerization is most preferred for the purpose of the present invention, because a desired graft polymer side chain can be introduced into an organic polymer base by irradiating the base to produce a radical and reacting it with a graft monomer and the number or length of the graft chain can be relatively freely controlled and the polymer side chain can be introduced into existing polymer materials in various shapes.

In the present invention, materials that can be used as bases into which is introduced a side chain in the form of a polymer chain containing a hydrophilic group include elemental polymer fibers and woven and nonwoven fabrics comprising an assembly thereof. Woven/nonwoven fabric materials can be suitably used as bases for radiation-induced graft polymerization and they have a large surface area and are light and easy to process. Water adsorbing/desorbing materials prepared from woven/nonwoven fabrics can be easily handled during disposal and readily incinerated, in contrast to conventional ion exchange resins having a crosslinked structure that are hard to incinerate.

Radiations that can be used in radiation-induced graft polymerization well suitable for the purpose of the present invention include α-rays, β-rays, γ-rays, electron rays, UV ray, etc., among which γ-rays and electron rays are preferred for use in the present invention. Radiation-induced graft polymerization includes preirradiation graft polymerization involving preliminarily irradiating a graft base and then bringing it into contact with a polymerizable monomer (graft monomer) for reaction, and simultaneous irradiation graft polymerization involving irradiating a system containing a base and a monomer, and either method can be used in the present invention. Radiation-induced graft polymerization includes various manners of contact between a monomer and a base, such as liquid phase graft polymerization performed with a base immersed in a monomer solution, gas phase graft polymerization performed with a base in contact with the vapor of a monomer, or immersion gas phase graft polymerization performed by immersing a base in a monomer solution and then removing it from the monomer solution for reaction in a gas phase, and any method can be used in the present invention.

Fibers and woven/nonwoven fabrics comprising a fiber assembly are the most preferred materials for use as organic polymer bases for water adsorbing/desorbing materials of the present invention, and are well suitable for use in the immersion gas phase graft polymerization because they tend to retain monomer solutions.

The hydrophilic group as a functional group for adsorbing/desorbing water in water adsorbing/desorbing organic polymer materials of the present invention can be selected from ion exchange groups such as cation exchange groups and anion exchange groups and non-ion exchange groups. Among them, ion exchange groups are preferred for the present invention because polymer graft side chains having an ion exchange group thereon tend to expand by repulsive force due to charges of adjacent ion exchange groups and promote diffusion of water molecules. For example, sulfonate acid group is negatively charged so that graft side chains repulse each other to rise under the influence of adjacent sulfonate acid groups, thus increasing the mobility of the graft side chains. Conversely, quaternary ammonium group is positively charged so that graft side chains repulse each other to rise similarly under the influence of adjacent quaternary ammonium groups.

These polymer side chains containing a hydrophilic group can be introduced onto the backbone of an organic polymer material by graft-polymerizing a polymerizable monomer having a hydrophilic group onto the backbone or by graft-polymerizing a polymerizable monomer not having a hydrophilic group by itself but capable of introducing a hydrophilic group onto the backbone and then introducing a hydrophilic group onto the grafted polymer side chain.

Among ion exchange groups, typical cation exchange groups are sulfonate acid group, phosphate group and carboxyl group, any of which can be used as a hydrophilic group in water adsorbing/desorbing organic polymer materials of the present invention. However, carboxyl group —COOH is not dissociated and graft side chains are interlaced by hydrogen bonds between carboxyl groups. This can be avoided by converting —COOH into an alkali salt or alkali earth salt form (—COOMe). The problem associated with carboxyl group does not occur in ion exchange groups such as sulfonate acid groups and phosphate groups because they are dissociated whether or not they are regenerative, but a global consideration is needed to select their salt forms because those salt forms have different water adsorbing/desorbing performance and heat stability.

Polymerizable monomers having a sulfonate acid group include sodium styrenesulfonate, sodium vinylsulfonate, sodium methallylsulfonate, etc. Polymerizable monomers having a carboxyl group include acrylic acid, methacrylic acid, etc. Sodium styrenesulfonate and acrylic acid can be used in combination to introduce a plurality of cation exchange groups at the same time. Polymerizable monomers not having a cation exchange group by themselves but capable of introducing a cation exchange group include glycidyl methacrylate, styrene, acrylonitrile, acrolein, chloromethylstyrene, etc. After these polymerizable monomers have been graft-polymerized, a cation exchange group can be introduced by known methods. For example, a sulfonate acid group can be Introduced onto a polymer side chain by graft-polymerizing styrene on a base and then reacting the grafted side chain with sulfuric acid or chlorosulfonic acid to sulfonate it.

These cation exchange groups introduced onto the polymer side chain can be expected to not only adsorb water but also adsorb basic gases and remove positively charged particles.

Anion exchange groups that can be used as hydrophilic groups in water adsorbing/desorbing organic polymer materials of the present invention can be selected from quaternary ammonium group, tertiary amino group, secondary amino group and primary amino group. However, quaternary ammonium group has limited applications because of the insufficient heat stability and emission of amine odor.

Polymerizable monomers having an anion exchange group include vinylbenzyltrimethylammonium chloride (VBTAC), dimethylaminoethyl methacrylate (DMAEMA), diethylaminoethyl methacrylate (DEAEMA), dimethylaminopropyl acrylamide (DKAPAA), etc. Polymerizable monomers not having an anion exchange group by themselves but capable of introducing an anion exchange group include glycidyl methacrylate, styrene, acrylonitrile, acrolein, chloromethylstyrene, etc. After these polymerizable monomers have been graft-polymerized, an anion exchange group can be introduced by known methods. For example, a quaternary ammonium group can be introduced onto a polymer side chain by graft-polymerizing chloromethyletyrene on a base and then immersing the base in an aqueous trimethylamine solution for conversion into a quaternary ammonium group.

These anion exchange groups introduced onto the polymer side chain can be expected to not only adsorb water but also adsorb basic gases and remove negatively charged particles.

Non-ion exchangeable hydrophilic groups such as amide and hydroxyl groups can also be used as hydrophilic groups in water adsorbing/desorbing organic polymer materials of the present invention. Polymerizable monomers having an amide group include acrylamide, dimethyl acrylamide, methacrylamide and isopropyl acrylamide, etc. Polymerizable monomers having a hydroxyl group include 2-hydroxyethyl methacrylate, etc. Polymerizable monomers not having these hydrophilic groups by themselves but capable of introducing these hydrophilic groups include glycidyl methacrylate, chloromethylstyrene, vinyl acetate, etc. After these polymerizable monomers have been graft-polymerized, a hydrophilic group can be introduced by known methods. For example, a hydroxyl group can be introduced onto a polymer side chain by graft-polymerizing glycidyl methacrylate on a base and then treating the base with an aqueous sulfuric acid solution with warming to open the epoxy group into a diol group.

A plurality of different kinds of hydrophilic groups can be introduced onto a graft side chain. For example, vinylbenzyltrimethylammonium chloride (VBTAC) having a quaternary ammonium group is often used in combination with acrylamide-based hydrophilic monomers or ester-based hydrophilic monomers because it is difficult to subject to radiation-induced graft polymerization alone, in which case a non-ion exchange group such as amide or ester group is introduced with the anion exchange quaternary ammonium group. Organic polymer materials having a plurality of different kinds of hydrophilic groups introduced onto their graft side chains can also be used as water adsorbing/desorbing materials of the present invention.

Organic polymer bases for water adsorbing/desorbing materials of the present invention are preferably polyolefin-based organic polymer materials. Polyolefin-based organic polymer materials are suitable for the purpose of introducing a graft side chain by radiation-induced graft polymerization because they are not degradable by radiations.

Various embodiments of the present invention are explained below. However, the present invention is not limited to the following description.

EXAMPLE 1

A heat-fused nonwoven cloth having an areal density of 50 g/m$^2$ made of a polyethylene terephthalate (core)/polyethylene (sheath) composite fiber of about 15 μm in diameter was used as an organic polymer base. This nonwoven cloth base was irradiated with γ-rays at 150 kGy in a nitrogen atmosphere and then immersed in glycidyl methacrylate and reacted at 50° C. for 4 hours to give a glycidyl methacrylate-grafted nonwoven cloth at a grafting degree of 133%. This grafted nonwoven cloth was immersed in an aqueous solution of 8% aqueous sodium sulfite and 12% isopropyl alcohol and heated at 80° C. for 8 hours to give a strongly acid cation exchange nonwoven material having a neutral salt decomposition capacity of 2.81 meq/g.

The resulting nonwoven cloth was cut into 10 cm square and regenerated with hydrochloric acid and then dried in a dryer at 60° C. for 3 hours. The nonwoven cloth was removed from the dryer and placed on a bench in a room at a relative humidity of 70% and a temperature of 25° C. where it was tested for change with time in weight gain resulting from adsorption of water in the air. A high water adsorption speed was obtained as shown by weight gains of 70 after 3 minutes and 12% after 10 minutes.

EXAMPLE 2

A nonwoven cloth base as used in Example 1 was Irradiated in the same manner as described in Example 1 and then immersed in a chloromethylstyrene solution and reacted at 40° C. for 7 hours to graft-polymerize chloromethylstyrene at a grafting degree of 116%. This nonwoven cloth was immersed in a 10% aqueous trimethylamine solution and reacted at 50° C. for 3 hours to give a strongly basic anion exchange nonwoven material having a neutral salt decomposition capacity of 2.32 meq/g.

The resulting nonwoven cloth was cut into 10 cm square and regenerated with an aqueous sodium hydroxide solution and then dried in a dryer at 50° C. for 5 hours. The nonwoven cloth was removed from the dryer and placed on a bench in a room at a relative humidity of 55% and a temperature of 22° C. where it was tested for change with time in weight gain resulting from adsorption of water in the air. A high water adsorption speed was obtained as shown by weight gains of 5.8% after 3 minutes and 10.3% after 10 minutes.

EXAMPLE 3

A nonwoven cloth base as used in Example 1 was Irradiated in the same manner and then immersed in a nonionic hydrophilic monomer acrylamide and reacted at 50° C. for 2 hours to graft-polymerize acrylamide at a grafting degree of 173%.

The resulting nonwoven cloth was cut into 10 cm square and dried in a dryer at 50° C. for 5 hours. The nonwoven cloth was removed from the dryer and placed on a bench in a room at a relative humidity of 55% and a temperature of 22° C. where it was tested for change with time in weight gain resulting from adsorption of water in the air. A high water adsorption speed was obtained as shown by weight gains of 4.9% after 3 minutes and 8.9% after 10 minutes.

EXAMPLE 4

The strongly acid cation exchange nonwoven cloth prepared in Example 1 and a 3 mm mesh diagonal net were layered and rolled up and closely packed in a glass tube having a diameter of 50 mm. An air flow at a relative humidity of 70% was fed to the glass tube at a flow rate of 50 L/min and the effluent air was collected for 5 minutes after inflow started. The collected air had a relative humidity of 43%. An air flow at 55° C. was further fed to the glass tube at the same flow rate for 5 minutes to desorb water adsorbed to the nonwoven cloth. Then, an air flow at a relative humidity of 70% was fed again at the same flow rate and the effluent air was collected. The collected air had a relative humidity of 43%, confirming that water adsorbing/desorbing properties of the nonwoven material can be repeatedly reproduced.

This composite article of a nonwoven cloth and an oblique net could be very easily prepared and readily incinerated after use.

COMPARATIVE EXAMPLE 1

A commercially available strongly acid cation exchange resin (DIAXON SK1B from Mitsubishi Chemical) was regenerated with hydrochloric acid and dried. Then, the resin was ground into a powdery ion exchange resin in a mill. This was bonded onto a flame-retardant paper based on ceramic fiber and glass fiber with an adhesive.

This powdery ion exchange resin-bonded paper was cut into 10 cm square and then dried In a dryer at 60° C. for 3 hours. The powdery ion exchange resin-bonded paper was removed from the dryer and placed on a bench in a room at a relative humidity of 70% and a temperature of 25° C. where it was tested for change with time in weight gain resulting from adsorption of water in the air. A water adsorption speed corresponding to weight gains of 3.5% after 3 minutes and 7.1% after 10 minutes was obtained. This was inferior to that of the strongly acid cation exchange nonwoven material in Example 1.

The steps of grinding anion exchange resin or bonding the ground ion exchange resin to a flame-retardant paper were laborious and unbound fine powdery ion exchange resin scattered to surroundings. This resin-bonded paper was incinerated in anticipation of disposal after use, but the ion exchange resin was hard to burn and many other problems occurred.

INDUSTRIAL APPLICABILITY

Water adsorbing/desorbing materials of the present invention characterized by having a polymer side chain containing a hydrophilic group on the backbone of an organic polymer base have high physical strength and rapidly adsorb/desorb and diffuse water molecules, so that they can attain more excellent water adsorbing/desorbing performance. Water adsorbing/desorbing materials of the present invention can efficiently desorb water even when the temperature of the regenerating heating air is low. They can adsorb/desorb not only water but also acid or basic gases and charged particles when an anion exchange group or a cation exchange group is introduced as a hydrophilic group. These water adsorbing/desorbing materials are readily disposable by incineration or other means and lighter and less expensive as compared with conventional ion exchange resins or the like.

The present invention includes the following aspects.
1. A water adsorbing/desorbing material characterized by having a polymer side chain containing a hydrophilic group on the backbone of an organic polymer base.
2. The water adsorbing/desorbing material as defined in 1 above wherein said organic polymer base is in the form of a woven or nonwoven cloth consisting of a fiber assembly.
3. The water adsorbing/desorbing material as defined in 1 or 2 above wherein said polymer side chain containing a hydrophilic group has been introduced onto the backbone of an organic polymer base by radiation-induced graft polymerization.
4. The water adsorbing/desorbing material as defined in any one of 1 to 3 above wherein said hydrophilic group is selected from cation exchange groups, anion exchange groups and non-ion exchange groups.
5. The water adsorbing/desorbing material as defined in 4 above wherein said cation exchange group is selected from sulfonate acid group, phosphate group and carboxyl group.
6. The water adsorbing/desorbing material as defined in 4 above wherein said anion exchange group is selected from quaternary ammonium group, tertiary amino group, secondary amino group and primary amino group.
7. The water adsorbing/desorbing material as defined in 4 above wherein said non-ion exchange group is selected from amide group and hydroxyl group.
8. A process for preparing the water adsorbing/desorbing material as defined in any one of 1 to 7 above, comprising graft-polymerizing a polymerizable monomer having a hydrophilic group to an organic polymer base or graft-polymerizing a polymerizable monomer capable of introducing a hydrophilic group and then introducing a hydrophilic group onto the grafted polymer side chain.

What is claimed is:

1. A desiccant material for adsorbing/desorbing moisture in gases, which has a polymer side chain containing a hydrophilic group on the backbone of a polyolefin base, the polymer side chain being introduced onto the backbone of the polyolefin base by radiation-induced graft polymerization, and wherein the desiccant material has no crosslinked structure.

2. The desiccant material as defined in claim 1 wherein said hydrophilic group is a cation exchange group selected from sulfonate acid group, phosphate group and carboxyl group.

3. The desiccant material as defined in claim 1 wherein said hydrophilic group is an anion exchange group selected from quaternary ammonium group, tertiary amino group, secondary amino group and primary amino group.

4. The desiccant material as defined in claim 1 wherein said hydrophilic group is a non-ion exchange group selected from amide group and hydroxyl group.

5. A process for preparing the desiccant material as defined in claim 1, comprising graft-polymerizing a polymerizable monomer having a hydrophilic group to a polyolefin base by radiation-induced graft polymerization or graft-polymerizing a polymerizable monomer capable of introducing a hydrophilic group to a polyolefin base by radiation-induced graft polymerization and then introducing a hydrophilic group onto the grafted polymer side chain.

* * * * *